Jan. 23, 1923.
J. R. MOFFATT ET AL.
BAG DARNING MACHINE.
FILED JULY 20, 1920.
1,442,816
6 SHEETS-SHEET 6
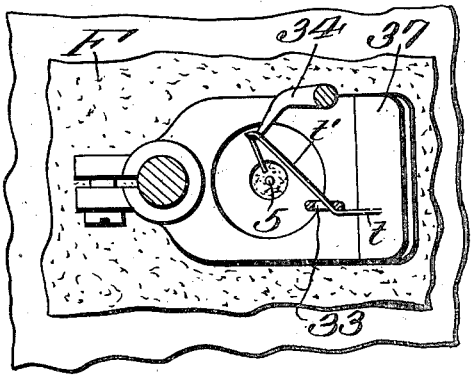
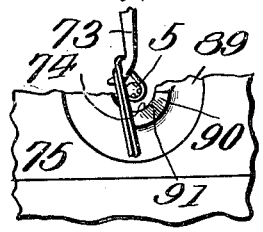
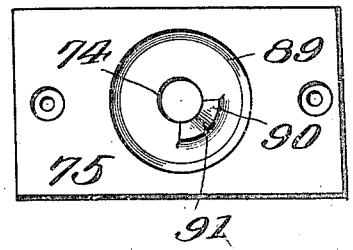
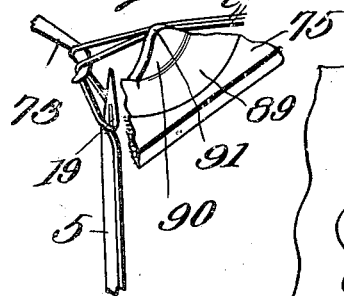
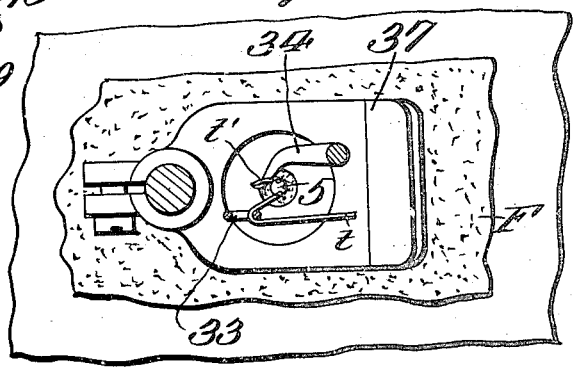
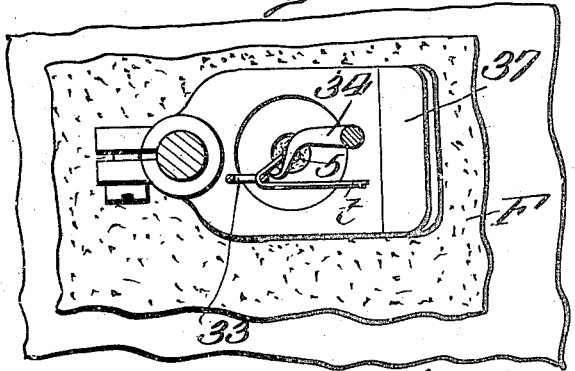
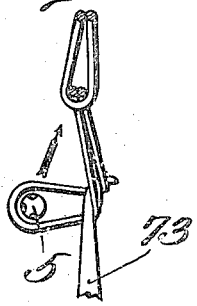
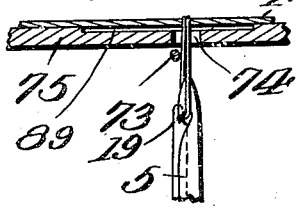
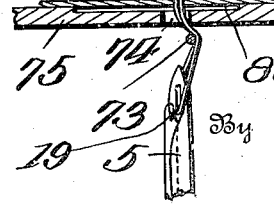
Inventors
James R. Moffatt
Ralph S. Kelso
By Sturtevant & Mason
Attorneys Patented Jan. 23, 1923.

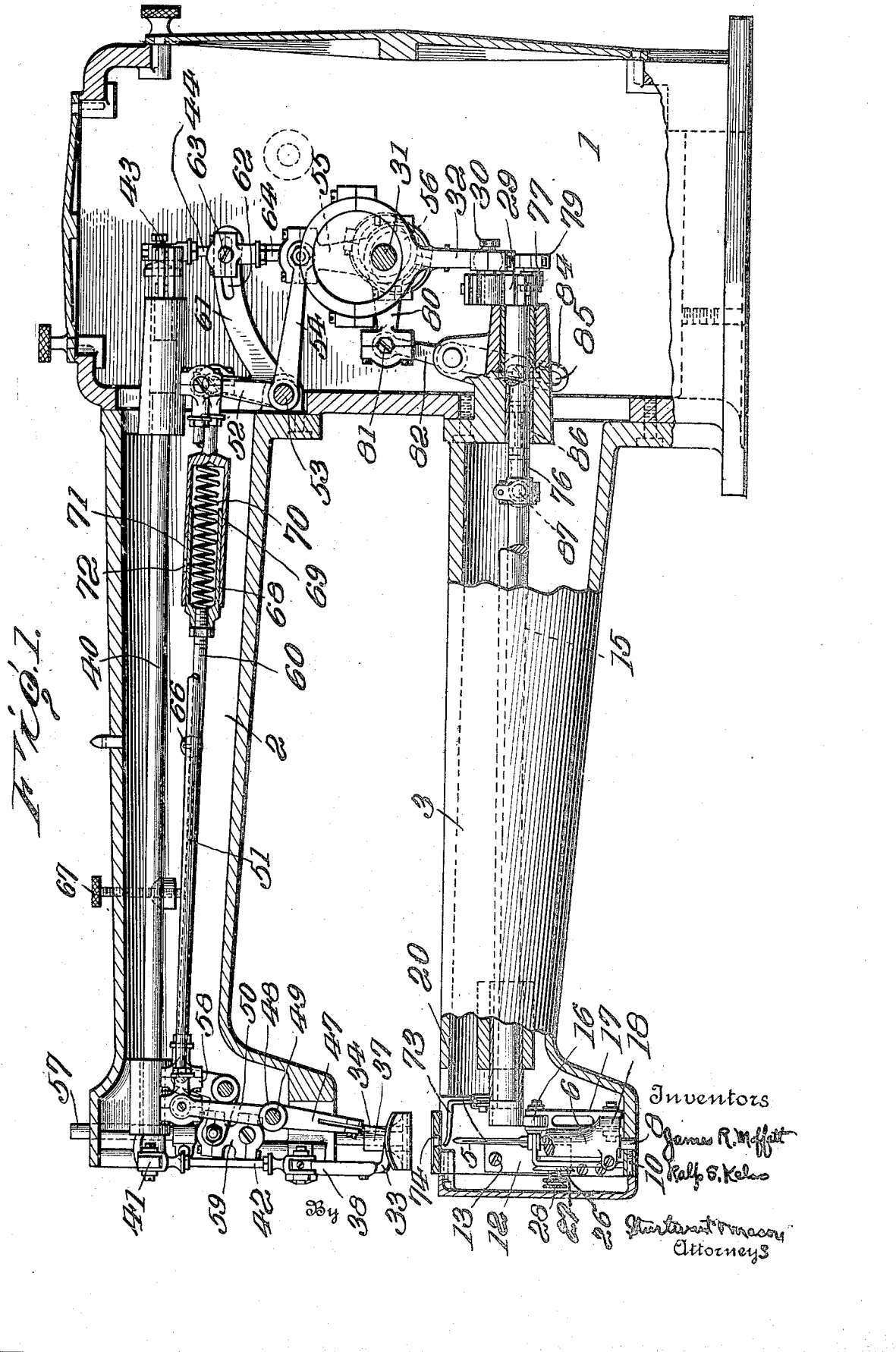

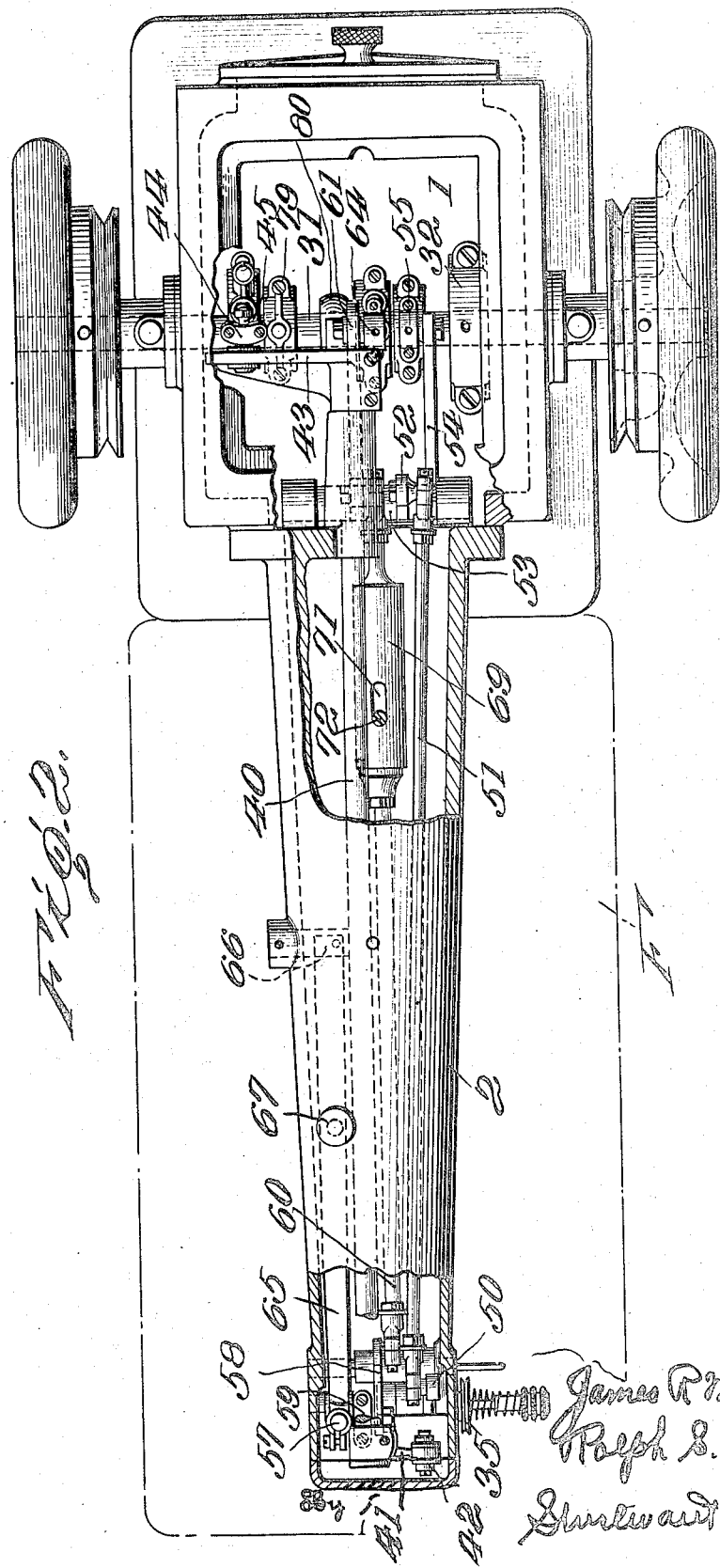

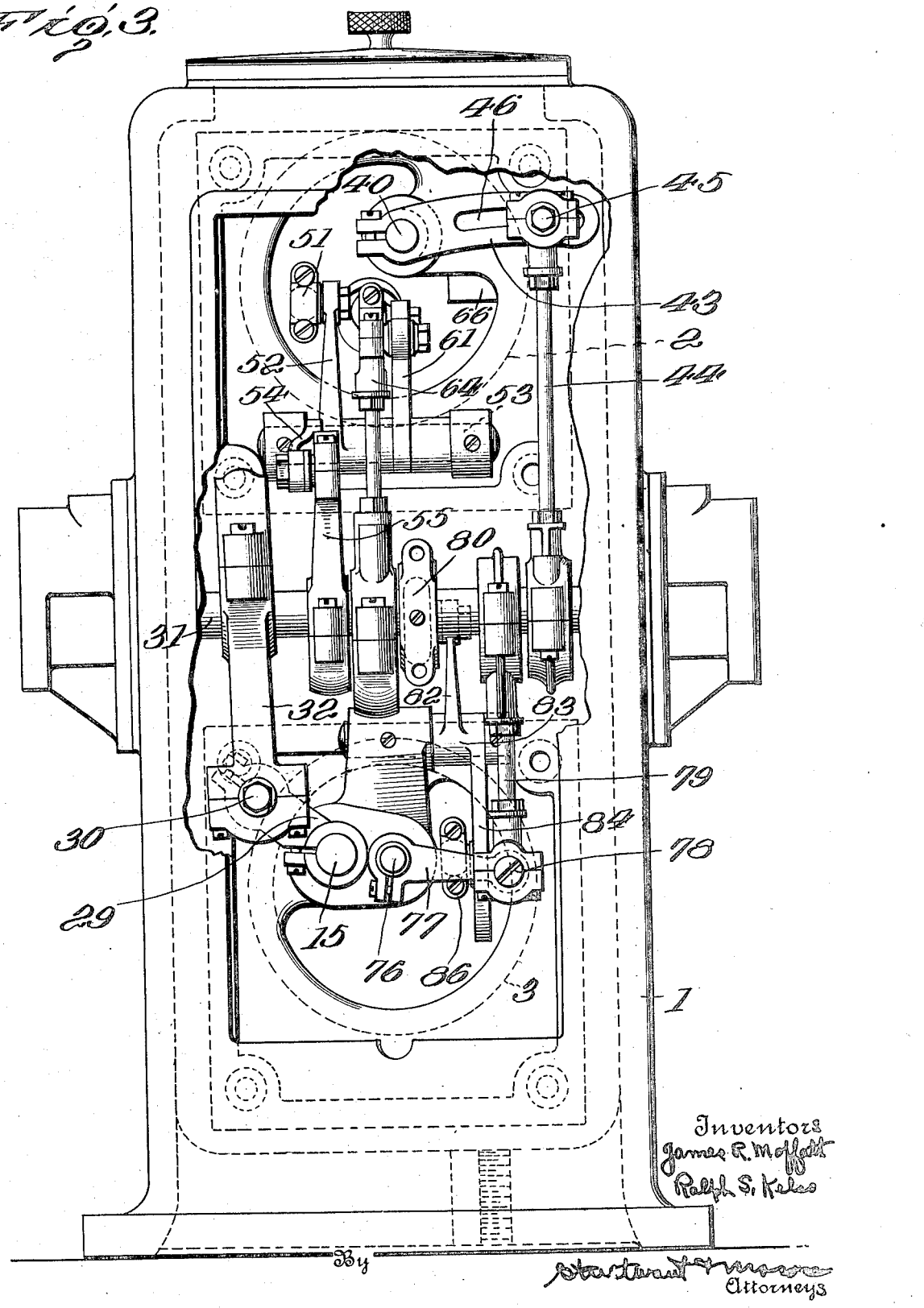

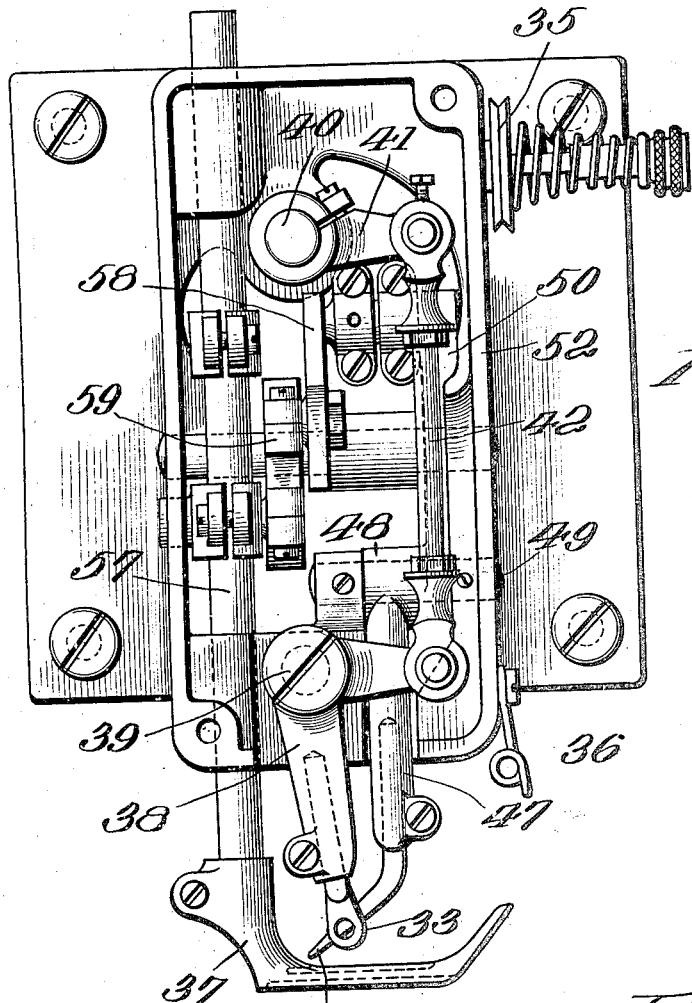

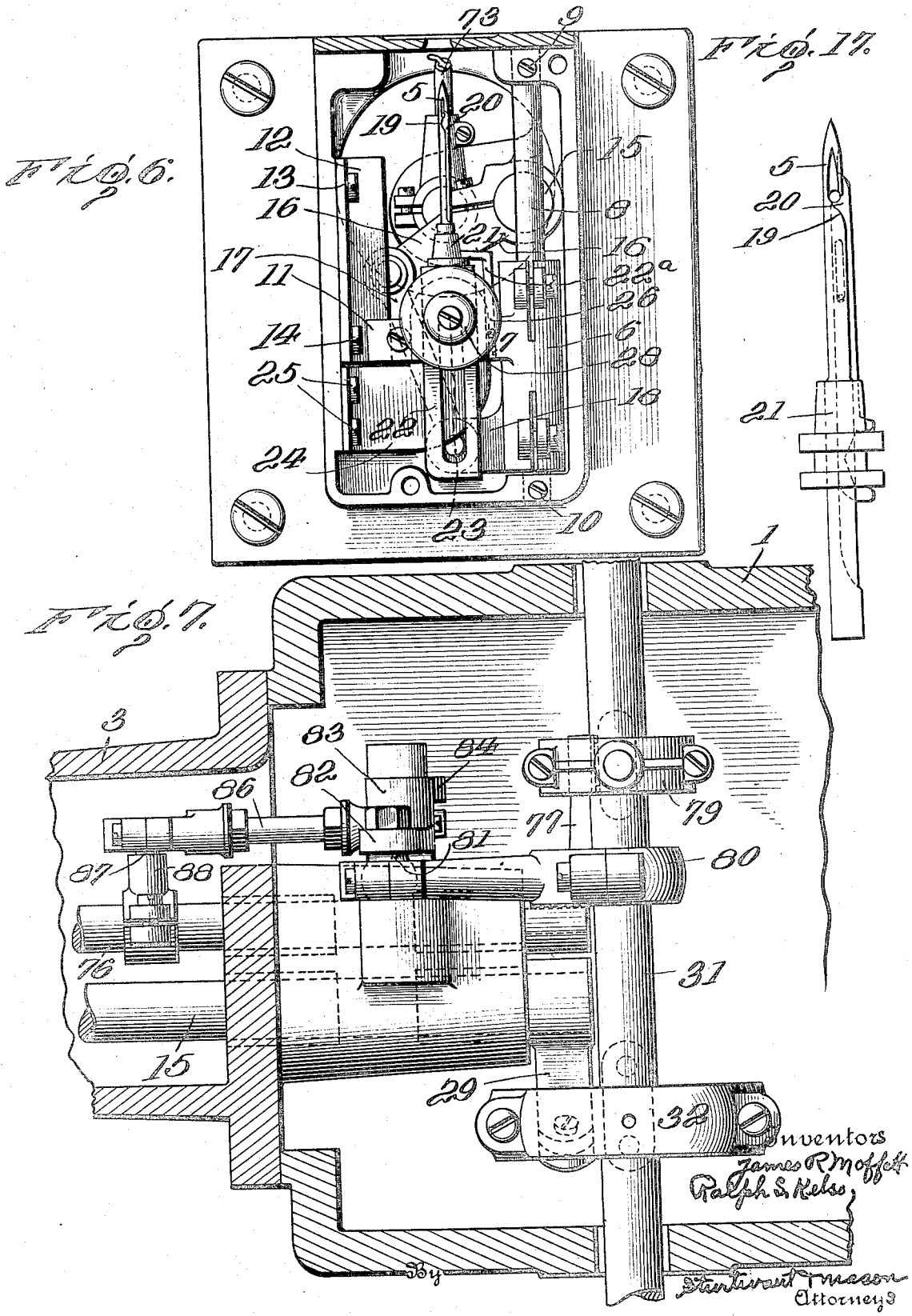

1,442,816

UNITED STATES PATENT OFFICE.

JAMES R. MOFFATT AND RALPH S. KELSO, OF CHICAGO, ILLINOIS, ASSIGNORS TO UNION SPECIAL MACHINE COMPANY, OF CHICAGO, ILLINOIS, A CORPORATION OF ILLINOIS.

BAG-DARNING MACHINE.

Application filed July 20, 1920. Serial No. 397,676.

*To all whom it may concern:*

Be it known that we, JAMES R. MOFFATT and RALPH S. KELSO, citizens of the United States, residing at Chicago, in the county of Cook, State of Illinois, have invented certain new and useful Improvements in Bag-Darning Machines, of which the following is a description, reference being had to the accompanying drawing and to the figures of reference marked thereon.

The invention relates to new and useful improvements in sewing machines, and more particularly to a chain stitch sewing machine which may be used for darning fabrics or for like purposes.

In our prior Patent #1,332,511, there is shown and described a chain stitch sewing machine of the above character, and the present invention is directed particularly to improvements in this particular type of machine.

An object of the invention is to provide a machine of the above character with mechanism for actuating the various parts, which includes eccentrics and a positive train of devices operated thereby, whereby the durability and the efficiency of the machine is greatly increased.

A further object of the invention is to provide a machine of the above type having a hook needle and devices for threading the hook needle, which move in single planes.

A further object of the invention is to provide a train of devices for raising the presser foot and lowering it into contact with the material, which train of devices is positively operated from an eccentric, and which train of devices include a yielding link so that the presser foot is positively forced toward the material and at the same time is yieldingly held in engagement with the material.

A still further object of the invention is to provide means for deflecting the shank of the loop held by the hook needle, when the feed is in a direction so as to tend to place said shank directly over the point of the needle, so as to insure that the point of the needle should pass at either one side or the other of the strands of the loop at the shank of the loop.

These and other objects will in part be obvious and will in part be hereinafter more fully described.

In the drawings which show by way of illustration one embodiment of the invention:—

Figure 1 is a vertical sectional view through the machine embodying our improvements;

Fig. 2 is a view partly in top plan and partly in horizontal section through the upper arm of the machine;

Fig. 3 is a view from the rear of the machine with the rear cover plate removed and parts broken away to more clearly show the inner mechanism;

Fig. 4 is a front end view of the head of the machine with the cover plate removed to show the mechanism in rear thereof;

Fig. 5 is a horizontal sectional view through the front end of the work supporting arm and showing the mechanism beneath the same in top plan view;

Fig. 6 is a view partly in front end elevation and partly in vertical section through the throat plate showing the mechanism beneath the throat plate;

Fig. 7 is a horizontal sectional view through the standard and a part of the work supporting arm on the line of the main shaft; some of the parts being removed;

Fig. 8 is a top plan view of a portion of the work support and the presser foot, and showing the needle beneath the material with its point just penetrating the material and the thread hook and thread guide holding the needle thread preparatory to presenting the same to the hook of the needle;

Fig. 9 is a similar view but showing the thread laid into the hook of the needle;

Fig. 10 is a similar view but showing the needle as having descended and the hook positioned for engagement with the thread;

Fig. 11 is a sectional view through the throat plate and the material showing the hook needle and the loop positioning finger just before it moves into engagement with the loop of thread on the hook needle;

Fig. 12 is a similar view but showing the thread loop as moved to one shank of the thread loop so as to prevent the needle from moving out of the loop and dropping a stitch;

Fig. 13 is a view in plan showing the needle, a loop concatenation of the thread, and the loop positioning finger holding the shank of the loop always in a predetermined position relative to the needle regardless of the direction of the feed which is indicated by the arrow in said figure;

Fig. 14 is a view in plan showing a part of the throat plate, the end of the loop positioning finger, and the needle, and the deflecting bridge for positioning the shank of the loop to prevent the needle passing between the strands of the threads forming the loop;

Fig. 15 is a perspective view of the same;

Fig. 16 is a plan view of the throat plate, and

Fig. 17 is an enlarged view of the needle.

As above noted, the invention is directed to an improvement in a machine of the type shown in applicant's prior patent, to which reference may be had for the general characteristics, or a machine in which the improvements are embodied. It will be noted that in the machine of the prior patent, a hook needle is used, which is reciprocated in a vertical plane and caused to pass up through the material where the thread is laid into the hook of the needle, by suitable thread manipulating devices, after which the needle draws the thread loop down through the fabric and through a previous loop surrounding the shank of the needle. A loop positioner moves across the path of the needle and engages the shank of the loop lying in the hook of the needle, and carries the same to a predetermined position relative to the needle so that the strands of the thread loop will always extend at a certain given angle from the hook of the needle to the loop positioning finger regardless of the direction of feed of the material. Therefore, the fabric being stitched may be fed in any direction, and a series of chain stitches will be formed. It is also clearly set forth in the patent that the fabric is fed back and forth, first in one direction and then another. Lines of chain loops may be formed or anchored in the fabric which cross each other, and which will effectively close a hole in the fabric.

The present machine is directed to certain improvements in the operating devices of the machine of the prior patent. These improvements consists first — in the use of eccentrics throughout for actuating the movable parts of the machine which produces a very quiet running machine, one which is capable of high speed, and one which is very durable; second — in the simplifying of the cooperating devices which lays the thread in the hook of the needle, so that only two devices are necessary, a thread guide and a thread hook, and these devices move in single planes oscillating about fixed centers, which planes are at right angles to each other or substantially so; third — in various modifications in detail of the needle bar supporting and guiding means; fourth — in the provision of a deflecting ridge located on the work support at the opposite side of the needle path from the loop positioning finger when said loop positioning finger is holding the shank of the loop on the needle, which deflecting ridge serves the purpose of deflecting the strands of the loop on the needle either to one side or the other of the point of the needle, and thus prevents the needle from passing between the two strands which would result in the dropping of a stitch.

Referring more in detail to the drawings, we have shown the invention as applied to a machine having a supporting standard 1 carrying an overhanging arm 2 and a work supporting arm 3. Said work supporting arm 3 may, if desired, be provided with a flat bed plate to aid in properly supporting the material. This flat bed plate, however, may be readily removed and the work supporting arm alone used when operating upon small articles. Said flat bed is indicated in dotted lines in Figure 2 at F. Mounted within the forward end of the work supporting arm is a needle 5. This needle is carried by a sliding bracket 6. The sliding bracket 6 is provided with an arm 7 in which the needle is clamped. This sliding bracket reciprocates on a rod 8 which is secured by means of screws 9 and 10 to the work supporting arm. The arm 7 is forked at 11 so as to engage the guiding plate 12 secured by bolts 13, 14 to the work supporting arm. The bracket is caused to reciprocate upon the rod 8 by means of a shaft 15 which carries an arm 16, and this arm is connected by a link 17 with a lug 18 on the bracket 6. As the shaft 15 oscillates, it will through the arm 16 and link 17, slide the bracket up and down on the rod 8.

The needle 5 is provided with a hook 19 thus forming an open eye into which the thread is laid. This eye is closed by means of a sliding latch 20 which slides in a longitudinal recess formed in the shank and blade of the needle. The latch 20 is secured to a sleeve 21 which slides on the needle shank and this sleeve 21 carries a depending slotted plate 22. This slotted plate straddles a stud 23. This stud 23 is carried by a bracket arm 24 secured by screws 25, 25 (see Fig. 6) to the work supporting arm. On said stud is a disk 26. Also on the stud and bearing against the disk is a spring 27. A thumb nut 28 is threaded on to the end of the stud and bears against the spring and serves as a means for adjusting the tension of the spring. The slotted plate 22 slides between the disk 26 and the face of the bracket arm 24. This serves as a means for putting a frictional tension on the sliding movement of the plate 22 and the sleeve which carries the latch for closing the hook of the needle.

When the parts are in the position shown in Fig. 6, the needle is clear down, and the latch is clear up, the hook of the needle being closed. As the needle starts on its upward movement, the slotted plate 22 will remain in the position shown in Fig. 6, owing to the frictional tension thereon, until the sleeve 21 engages the arm 7, after which the sleeve 21 and plate 22 will then move upwardly with the needle bar. This first movement of the needle before the sleeve carrying the latch is moved, causes the hook of the needle to move away from the latch and open the eye of the hook needle. The loop of thread within the hook of the needle moves down over the shank, or rather the shank of the needles moves up into the needle loop. As the needle starts downwardly, the plate 22 will be held by the frictional tension thereon, and the needle shank will move down through the sleeve 21 carrying the loop until the latch has closed the open eye of the hook needle. The friction on the sleeve and latch are then overcome by an arm 22$^a$ bearing against the upper face of the sleeve 21 as shown in Fig. 6, and then said sleeve and latch move down with the needle until the parts reach the position shown in Fig. 6. By this arrangement, the mouth of the needle hook is closed before the hook of the needle passes the fabric, and therefore there is no liability of said hook engaging the threads of the fabric. Furthermore, the loop on the shank of the needle will slide up along the shank and over the hook as the mouth of the hook is closed, and off from the needle.

The shaft 15 is mounted in suitable bearings in the machine, and extends through the arm 3 and into the hollow standard 1. On the inner end of this shaft 15 there is an arm 29 carrying a ball stud 30. On the main shaft 31 there is an eccentric with which an eccentric strap 32 cooperates. This eccentric strap 32 is connected to the ball stud 30. As the main shaft rotates, this eccentric strap will oscillate the shaft 15 and the shaft 15, through the arm 16 and link 17 will reciprocate the bracket carrying the needle bar and needle.

After the needle hook is moved above the surface of the fabric, a thread is laid into the eye of the hook by means of a thread guide 33 and a thread hook 34. The thread is led from a suitable source of supply through a tension device 35, thence through a thread eye 36 to the thread guide 33.

Referring particularly to Figures 8, 9 and 10, it will be noted that the thread, which is indicated at $t$ passes through the thread guide 33 and thence to the previous stitch. This thread guide moves back and forth in a direction lengthwise of the presser foot which is indicated at 37 in the drawings. The thread hook 34 moves in a direction at right angles to the path of movement of the thread guide and engages the thread between the thread guide and the fabric. As the thread hook moves away from the thread guide, from the position shown in Fig. 10, it engages this thread, and the thread guide moves forwardly until the parts are positioned as shown in Fig. 8, where the point of the needle 5 is shown just piercing through the fabric which is indicated at F. After the needle reaches the upper end of its stroke, then the thread guide moves rearwardly and carries the section $t'$ of the thread $t$ into the open hook of the needle as clearly shown in Fig. 9. After the thread has been laid into the hook of the needle, and the needle starts downwardly, the hook 34 releases the thread.

The thread guide 33 is mounted upon a rocker arm 38 which is pivoted at 39 to the head of the machine. Said thread guide may be adjusted lengthwise of the arm which carries the same. Mounted in the overhanging arm and extending lengthwise thereof is a shaft 40, which carries an arm 41 at the front end of the machine, and this arm is connected by a link 42 to the rocker arm 38. The shaft 40 extends into the hollow standard at the rear of the overhanging arm 2 and on the rear end of said shaft is a slotted arm 43. An eccentric strap 44 cooperates with an eccentric on the main shaft 31 and is connected with a ball stud 45 which is capable of adjustment in a slot 46 of the slotted arm 43. As the main shaft oscillates, it will oscillate the shaft 40, and the extent of movement imparted to said shaft may be varied by adjusting the position of the ball stud 45 in the slot 46. The oscillations of the shaft 40 will swing the thread guide 33 in a vertical plane parallel with the longitudinal axis of the presser foot 37.

The thread hook 34 is mounted in the lower end of an arm 47 so that it may be adjusted lengthwise of the arm. The arm 47 is carried by a sleeve 48 mounted to oscillate freely on a supporting rod 49. Extending upwardly from the sleeve 48 is an arm 50 which is connected to the link 51. The link 51 is pivoted at its inner end to an arm 52 carried by a sleeve pivoted at 53. This sleeve also carries an arm 54. An eccentric strap 55 cooperating with an eccentric 56 reciprocates the link 51 endwise and thus swings the thread hook 34 backward and forward in a single plane at right angles to the plane of movement of the thread guide 33. These two movements are timed so as to accomplish the result described in detail above.

The presser foot 37 is carried by a presser bar 57 which is mounted to move up and down in suitable bearings in the head at the forward end of the overhanging arm. Said presser foot is raised from the fabric positively by means of a rock lever 58 which is connected by a link 59 to a lug on the presses bar 57. The rock lever 58 is in turn pivotally connected with a link 60, and this link 60 is pivoted to another rock lever 61 which is pivoted at 53. This rock lever 61 has an arm formed with a slot 62. A bald stud 63 is adjustably mounted in said slot 62. An eccentric strap 64 is connected to this ball stud 63 and cooperates with an eccentric on the main shaft. The presser bar is yieldably forced downwardly by means of a spring 65 which is fulcrumed on a stud 66 and the tension thereof is adjusted by means of a screw 67. Said springs 65, at its forward end, bears on a lug carried by the presser bar.

The link 60 is provided with a spring coupling consisting of a sleeve 68 telescoping within a sleeve 69 and located within these sleeves, is a spring 70. The outer sleeve 69 is formed with a slot 71 and in this slot is a screw stud 72 which is threaded into the inner sleeve 68. The spring normally tends to separate the telescoping sleeves and this stud limits the separating movement. When the main shaft is rotated, the eccentric reciprocates the link 60 once for each complete rotation of the main shaft. The link 60 as it is moved to the left as viewed in Fig. 1, will move the presser foot down on to the fabric and when the foot engages the fabric, and can move no further, then the spring 70 will yield, allowing the outer sleeve to slide to the left as viewed in this Fig. 1 on the inner sleeve. When the link 60 is moved to the right, as viewed in this figure, the telescoping sleeves will move one upon the other until the stud 72 strikes the end of the slot 71, after which the presser foot will be positively raised.

The present invention is especially adapted for forming lines of stitching used in darning and in order to accomplish this, the feed must be universal. The feed of the fabric is accomplished by hand, and the fabric may be moved in any direction relative to the needle, and to any desired extent, within limits. Preferably it is moved a distance corresponding to a relatively long stitch length in ordinary sewing. The presser foot is raised positively from the fabric at each reciprocation of the needle, and at the time when the needle is withdrawn from the fabric, and therefore the fabric may be readily shifted by hand, and in any direction. This allows the lines of stitching formed, to be crossed one over the other in various directions as is necessary for darning a hole in a fabric.

Beneath the work support is a loop positioning finger 73. This loop positioning finger moves back and forth in a direction of its length, and also laterally, so that the finger is moved forward at one side of the needle, thence across the needle path and back on the other side of the needle path; or in other words, is given substantially a four-motion movement. In Fig. 11 of the drawings, we have shown the position of the finger 73 as the hook needle draws this loop down through the fabric and the holes 74, of the throat plate 75. In Fig. 12 we have shown the loop positioning finger as moved across the needle path and engaged with the shank of the needle thread loops carried in the open eye of the hook needle. This positioning finger always moves moves in a fixed path and will therefore carry the base of the needle thread loop to a fixed position regardless of the direction of the feed of the fabric being stitched. In Fig. 13 of the drawings, we have shown the feed of the fabric as indicated by the arrow in a direction substantially parallel with the length of the loop positioning finger 73.

This loop positioning finger 73, as above noted, always moves in a fixed path relative to the needle, and this path is so determined as to carry the shank of the thread loop rearwardly from the eye of the hook needle as clearly illustrated in Figures 11 and 12. As a result, when the needle rises, the point of the needle will always come up through the needle thread loop in the hook of the needle, and the needle thread loop will be caused to pass down on to the shank of the needle.

This loop positioning finger 73 is mounted on the outer end of a shaft 76. This shaft 76 is mounted in suitable bearings carried by the work supporting arm 3, so that said shaft may be both oscillated and moved endwise. The shaft extends into the hollow work supporting standard 1 and carries on its inner end an arm 77. On the outer end of the arm 77 is a ball stud 78. An eccentric strap 79 cooperating with an eccentric on the main shaft 31 engages this ball stud 78 and serves as a means for oscillating the shaft 76.

An eccentric strap 80 cooperating with an eccentric in the main shaft 31 engages a ball stud 81 on the upper end of an arm 82. This arm 82 is carried by a sleeve 83, which sleeve also carries a downwardly extending arm 84. The arm 84 is slotted at 85 and a ball stud is adjustably mounted in said slot 85. A link 86 is connected at one end to the ball stud mounted in the slot 85 and at its other end to a ball stud 87 carried by an arm 88 fixed to the shaft 76. This provides a means for moving the shaft 76 endwise, and the endwise movements of the shaft 76, together with the oscillations thereof, give to the loop positioning finger the movements above described.

The throat plate 75 is provided with a depression 89 which is circular in outline, and the stitch length does not exceed the radial length of this circular depression 89. This prevents the threads from being clamped so tightly by the presser foot as to prevent the drawing up of the loop which is shed by the needle.

It will be apparent from Figures 14 and 15 that if the direction of feed is in a line lying in a vertical plane passing through the center of the needle, and the point of support of the loop on the loop positioning finger 73, the strands of the loop between the positioning finger and the fabric would be directly over the point of the needle. In such a case, the point of the needle might pass up between the strands in the needle thread loop on the needle, and thus the loop would be shed from the looper and a stitch would be dropped. In order to prevent the strands lying directly over the point of the needle at this critical period, we have provided the throat plate 75 with a projection 90, which projection is substantially curved about the center of the throat plate and tapers from the central high point 91 downwardly at each side thereof. As a result, when the strands between the loop positioning finger and the fabric which are indicated at $t^2$ in Fig. 15, are likely by the direction of feed, of being positioned directly over the point of the needle, they will be brought to bear upon this tapered projection, and the tapered projection will deflect both strands, either to one side or the other of the needle path, and thus insure the forming of a perfect stitch.

It is not thought necessary to describe in detail the operation of the machine, more than to state that the fabric which is to be stitched is placed beneath the presser foot, the needle rises through the fabric or through the hole in the fabric, the thread is laid into the hook of the needle, chain stitches are formed, and the line of chain stitching may be directed back and forth across the opening until the hole in the fabric is completely filled and closed. The thread is laid into the hook of the needle by two implements only, each of which moves in a single plane, and these implements are positively vibrated by means of eccentrics and connecting links and levers. The needle is reciprocated by means of an eccentric and the latch for closing the open eye of the hook receives its movements through the operating mechanism for the needle itself. The thread retaining finger is also moved by a single shaft, and through eccentrics and connecting links and levers.

From the above it will be apparent that the machine is a very simple machine, wherein all the parts are positively actuated by means of eccentrics, and therefore the machine is durable and may be driven at high speed. Furthermore, it will be noted that the actuated parts have been reduced to a minimum. Then again it will be noted that the feed of the fabric may be in any direction relative to the needle without any liability of the skipping of stitches.

It is obvious that minor changes in the details of construction and the arrangement of the parts may be made without departing from the spirit of the invention as set forth in the appended claims.

Having thus described our invention, what we claim as new and desire to secure by Letters Patent, is:—

1. The combination of a work support, a hook needle, means for reciprocating said hook needle, means for positioning the loop on the hook needle so as to insure retaining the loop on the needle as it moves upwardly regardless of the direction of feed of the fabric, and means for threading the hook of the needle including a thread guide moving back and forth in a single plane and a thread hook adapted to co-operate with said thread guide in placing the thread into the hook of the needle.

2. The combination of a work support, a hook needle, means for reciprocating said hook needle, means for positioning the loop on the hook needle so as to insure retaining the loop on the needle as it moves upwardly regardless of the direction of feed of the fabric, and means for threading the hook of the needle including a thread guide, means for supporting said thread guide whereby it may be oscillated back and forth in a single plane, an eccentric, and a train of devices operated thereby for positively oscillating said thread guide, a thread hook, means for supporting said thread hook whereby it may be oscillated in a direction at right angles to the plane of oscillation of the thread guide, said thread hook being adapted to engage the thread and cooperate with the thread guide in placing the thread in the hook of the needle.

3. The combination of a work support, a hook needle, means for reciprocating said hook needle, means for positioning the loop on the hook needle so as to insure retaining the loop on the needle as it moves upwardly regardless of the direction of feed of the fabric, and means for threading the hook of the needle including a thread guide, means for supporting said thread guide whereby it may be oscillated back and forth in a single plane, an eccentric, and a train of devices operated thereby for positively oscillating said thread guide, a thread hook, means for supporting said thread hook whereby it may be oscillated in a direction at right angles to the plane of oscillation of the thread guide, said thread hook being adapted to engage the thread and cooperate with the thread guide in placing the thread in the hook of the needle, an eccentric, and a train of devices operated by said eccentric for oscillating said thread hook.

4. The combination of a work support, a hook needle, means for reciprocating said hook needle, means for positioning the loop on the hook needle so as to insure retaining the loop on the needle as it moves upwardly regardless of the direction of feed of the fabric, and means for threading the hook of the needle including a thread guide, a rock arm carrying said thread guide mounted to oscillate in a single plane, a shaft, means for oscillating said rock arm from said shaft, a main shaft, an eccentric thereon, and means whereby said eccentric oscillates said shaft connected to the thread guide, a thread hook cooperating with the thread guide, and means for oscillating said thread hook in a single plane at right angles to the plane of movement of the thread guide.

5. The combination of a work support, a hook needle, means for reciprocating said hook needle, means for positioning the loop on the hook needle so as to insure retaining the loop on the needle as it moves upwardly regardless of the direction of feed of the fabric, and means for threading the hook of the needle including a thread guide, a rock arm carrying said thread guide mounted to oscillate in a single plane, a shaft, means for oscillating said rock arm from said shaft, a main shaft, an eccentric thereon, and means whereby said eccentric oscillates said shaft connected to the thread guide, a thread hook cooperating with the thread guide, means for oscillating said thread hook in a single plane at right angles to the plane of movement of the thread guide, and means whereby the extent of movement of the thread guide may be varied.

6. The combination of a work support, a hook needle, means for reciprocating said hook needle, means for positioning the loop on the hook needle so as to insure retaining the loop on the needle as it moves upwardly regardless of the direction of feed of the fabric, and means for threading the hook of the needle including a thread guide, a rock arm carrying said thread guide mounted to oscillate in a single plane, a shaft, means for oscillating said rock arm from said shaft, a main shaft, an eccentric thereon, and means whereby said eccentric oscillates said shaft connected to the thread guide, a thread hook cooperating with the thread guide, an arm supporting said thread hook, a sleeve carrying said arm, a second arm carried by said sleeve, a rock arm, an eccentric for actuating said rock ram, and a link imparting the oscillations of the rock arm to said arm connected to the sleeve supporting the hook.

7. The combination of a work support, a presser foot holding the material on the work support, a hook needle, means for reciprocating the needle, means for threading the needle, means cooperating with the needle whereby the loop on the needle is retained by the needle as it rises regardless of the direction of feed, an eccentric, means actuated by said eccentric for positively raising the presser foot to permit the feed of the fabric and yieldingly forcing said presser foot against the fabric during the upward movement of the needle.

8. The combination of a work support, a presser foot holding the material on the work support, a hook needle, means for reciprocating the needle, means for threading the needle, means cooperating with the needle whereby the loop on the needle is retained by the needle as it rises regardless of the direction of feed, an eccentric, means actuated by said eccentric for positively raising the presser foot to permit the feed of the fabric and yieldingly forcing said presser foot against the fabric during the upward movement of the needle, said means for raising the presser foot including telescoping sleeves, a spring for normally separating the sleeves, said sleeves having cooperating limiting stops.

9. The combination of a work support, a presser foot for holding the material on the work support, a hook needle, means for supporting said hook needle beneath the work support and for reciprocating the same through the material, means above the work support for threading the hook, means beneath the material for engaging the loop on the hook needle for positioning said loop whereby said loop is retained on the needle as the needle rises regardless of the direction of feed, means for positively raising the presser foot when the needle is down to permit the free feed of the material by hand, and means for yieldingly forcing the presser foot against the material while the needle is rising through the material.

10. The combination of a work support, a presser foot for holding the material on the work support, a hook needle, means for supporting said hook needle beneath the work support and for reciprocating the same through the material, means above the work support for threading the hook, means beneath the material for engaging the loop on the hook needle for positioning said loop whereby said loop is retained on the needle as the needle rises regardless of the direction of feed, means for positively raising the presser foot when the needle is down to permit the free feed of the material by hand, and means for yieldingly forcing the presser foot against the material while the needle is rising through the material, said last named means including a link, telescoping sleeves formed therein, a spring within said telescoping sleeves and normally separating the sleeves, a slot in one sleeve, and a stud carried by the other sleeve extending into said slot and operating to limit the movements of the sleeves whereby the presser foot is positively raised.

11. The combination of a work support, a presser foot, a hook needle, means for supporting said hook needle beneath the material and raising the needle through the material, means for threading said needle, a loop retaining device, means for moving the same into engagement with the strands forming the thread loop for positioning said strands so that the point of the needle will rise through the needle thread loop and means engaging the strands of the thread forming the loop between the loop retaining device and the material for moving said strands to one side or the other of the needle point when the direction of feed is in a direction parallel with the line passing through the point of the needle and the point of engagement of the strands of the loop with the loop retaining device.

12. The combination of a work support, a presser foot, a hook needle, means for supporting said hook needle beneath the material and raising the needle through the material, means for threading said needle, a loop retaining device, means for moving the same into engagement with the strands forming the thread loop for positioning said strands so that the point of the needle will rise through the needle thread loop and means engaging the strands of the thread forming the loop between the loop retaining device and the material for moving said strands to one side or the other of the needle point when the direction of feed is in a direction parallel with the line passing through the point of the needle and the point of engagement of the strands of the loop with the loop retaining device, said positioning means including a V-shaped projection carried by the throat plate and extending upwardly therefrom and disposed adjacent the needle thread in said throat plate.

13. The combination of a work support, a hook needle mounted beneath the work support, means for reciprocating said hook needle, a loop retaining device for engaging the strands of the loop on the needle for positioning the loop so as to insure the point of the needle rising through the loop, a shaft supporting said loop retaining device, means for moving said shaft endwise, and means for oscillating said shaft, said means being timed so as to cause the loop retaining device to cross the path of the needle when the needle is down and to move at one side of the needle as it releases the loop of thread on the needle.

In testimony whereof we affix our signatures.

JAMES R. MOFFATT.
RALPH S. KELSO.